United States Patent [19]

Laughner

[11] Patent Number: 5,189,091
[45] Date of Patent: * Feb. 23, 1993

[54] POLYCARBONATE/AROMATIC POLYESTER BLENDS MODIFIED WITH A GRAFTED OLEFIN COPOLYMER

[75] Inventor: Michael K. Laughner, Lake Jackson, Tex.

[73] Assignee: The Dow Chemical Company, Midland, Mich.

[*] Notice: The portion of the term of this patent subsequent to May 29, 2007 has been disclaimed.

[21] Appl. No.: 617,829

[22] Filed: Nov. 26, 1990

Related U.S. Application Data

[63] Continuation-in-part of Ser. No. 347,838, May 4, 1989, abandoned.

[51] Int. Cl.⁵ .............. C08L 69/00; C08L 67/02
[52] U.S. Cl. .................. 524/445; 524/449; 524/451; 524/456; 524/537; 525/67; 525/92; 525/133; 525/146; 525/425; 525/439
[58] Field of Search ............. 525/66, 67, 92, 133, 525/146, 425, 439; 524/445, 449, 451, 456, 537

[56] References Cited

U.S. PATENT DOCUMENTS

| | | | |
|---|---|---|---|
| 2,396,963 | 3/1946 | Mortenson | 525/539 |
| 3,780,140 | 12/1973 | Hammer | 260/884 |
| 4,172,859 | 10/1979 | Epstein | 428/402 |
| 4,180,494 | 12/1979 | Fromuth et al. | 525/69 |
| 4,267,096 | 5/1981 | Bussink et al. | 525/439 |
| 4,476,274 | 10/1984 | Liu | 524/445 |
| 4,536,538 | 8/1985 | Liu | 524/508 |
| 4,536,542 | 8/1985 | Allen | 525/67 |
| 4,564,658 | 1/1986 | Liu | 525/177 |
| 4,639,481 | 1/1987 | Giles, Jr. | 524/128 |
| 4,833,203 | 12/1989 | Endo et al. | 525/67 |
| 4,859,738 | 8/1989 | Farah et al. | 525/67 |
| 4,866,123 | 9/1989 | Wittmann et al. | 525/67 |
| 4,880,908 | 11/1989 | Lutz et al. | 525/468 |
| 4,929,672 | 5/1990 | Laughner | 525/67 |
| 4,929,673 | 5/1990 | Laughner | 525/92 |

FOREIGN PATENT DOCUMENTS

| | | |
|---|---|---|
| 0034252 | 8/1981 | European Pat. Off. |
| 0142802 | 5/1985 | European Pat. Off. |
| 179555 | 3/1986 | Japan |

Primary Examiner—David J. Buttner

[57] ABSTRACT

A polycarbonate blend of good impact strength, solvent resistance and weldline properties is prepared by admixing with polycarbonate an aromatic polyester, a grafted olefin/carbon monoxide copolymer and, optionally, an elastomeric toughening agent such as a rubber, and, optionally, a filler.

24 Claims, No Drawings

POLYCARBONATE/AROMATIC POLYESTER BLENDS MODIFIED WITH A GRAFTED OLEFIN COPOLYMER

This application is a continuation-in-part of Ser. No. 07/347,838, filed May 4, 1989 now abandoned.

BACKGROUND OF THE INVENTION

This invention relates to compositions containing polycarbonate blended with other polymers, and relates particularly to polycarbonate compositions having both improved solvent resistance and improved impact strength.

Polycarbonate has found many uses because, in general, it combines a high level of heat resistance and dimensional stability with good insulating and non-corrosive properties, and it is easily molded. It does, however, suffer from a tendency to craze and crack under the effects of environmental stress, especially contact with organic solvents such as gasoline. Polycarbonate which has crazed is, undesirably, more likely to experience brittle rather than ductile failure. This disadvantage has been somewhat relieved by the practice of blending polycarbonate with various substances such as the olefin polymers polyethylene, polypropylene or polyisobutylene, as described for example in Goldblum, U.S. Pat. No. 3,431,224. These added substances are capable of improving the resistance of polycarbonate to solvents, but they tend to cause an offsetting reduction in the toughness, impact resistance and weldline strength of the blended composition. Additionally, it is frequently found that when the polycarbonate is modified with substances such as polyolefins, the added substances tend to separate in the blend from the polycarbonate and delaminate as evidenced by peeling or splintering. It would accordingly be desirable if substances admixed with polycarbonate for the purpose of improving the environmental stress failure resistance ("ESFR") thereof (e.g. solvent resistance) did not also deleteriously affect its toughness and impact and weldline strength, and cause delamination as evidenced by peeling or splintering.

SUMMARY OF THE INVENTION

This invention involves a composition of matter containing, in admixture, an aromatic carbonate polymer, an aromatic polyester, a grafted olefin/carbon monoxide copolymer, optionally, an elastomeric toughening agent, and, optionally, a filler.

It has been found that a blended composition prepared by blending or admixing polycarbonate and an aromatic polyester with a grafted olefin copolymer possesses levels not only of ESFR but also of toughness, impact resistance and weldline strength which are improved over those of polycarbonate not blended with such components.

The compositions of this invention are useful, for example, in the production of films, fibers, extruded sheets, multi-layer laminates and molded or shaped articles of virtually all varieties, especially appliance and instrument housings, automobile body panels and other components for use in the automotive and electronics industries.

DETAILED DESCRIPTION OF THE INVENTION

The compositions of this invention are those in which (a) polycarbonate has been admixed in a blended composition with (b) an aromatic polyester (such as polyethylene terephthalate—"PET"); (c) a grafted olefin copolymer; optionally, (d) a toughening agent such as a butyl acrylate or methacrylate/butadiene/styrene ("MBS") rubber; and optionally, (e) a filler such as talc. Suitable ranges of content for the compositions of this invention, in parts by weight of the total composition, are as follows: polycarbonate from about 9 parts to about 94 parts, aromatic polyester from about 5 parts to about 90 parts, grafted olefin copolymer from about 1 part to about 25 parts, toughening agent up to about 20 parts, and filler up to about 40 parts. Compositions prepared within the above ranges of content possess levels of a combination of not only ESFR, but also toughness and impact and weldline strength, which are improved over those of polycarbonate not blended with the above mentioned components.

Preparation of the compositions of this invention can be accomplished by any suitable means known in the art. Typically the substances to be admixed with polycarbonate are dry blended in particulate form with sufficient agitation to obtain thorough distribution thereof within the polycarbonate. If desired, the dry-blended formulation can further, but need not, be melt mixed in an extruder, although mixing rolls, a dough-mixer or a Banbury mixer can also be used for such purpose. Alternatively, a master batch formulation can be prepared containing polycarbonate and the substances to be admixed or blended with it wherein polycarbonate is present in only a minor proportion, e.g. 20%. The master batch is then available for storage or shipment in commerce, and can be diluted with additional polycarbonate at the time of use. The compositions of this invention can be formed or molded using conventional techniques such as compression, injection, calendering, vacuum forming, extrusion and/or blow molding techniques, alone or in combination. The compositions can also be formed into films, fibers, multi-layer laminates or extruded sheets on any machine suitable for such purpose.

(a) Polycarbonate. The aromatic polycarbonates suitable for use in the present invention are produced by any of the conventional processes known in the art for the manufacture of polycarbonates. Generally, aromatic polycarbonates are prepared by reacting an aromatic dihydric phenol with a carbonate precursor, such as for example phosgene, a haloformate or a carbonate ester.

A preferred method for preparing the aromatic polycarbonates suitable for use in the present invention involves the use of a carbonyl halide, such as phosgene, as the carbonate precursor. This method involves passing phosgene gas into a reaction mixture containing an activated dihydric phenol, or a nonactivated dihydric phenol and an acid acceptor, such as for example pyridine, dimtheyl aniline, quinoline and the like. The acid acceptor may be used undiluted or diluted with inert organic solvents, such as methylene chloride, chlorobenzene or 1,2-dichloroethane. Tertiary amines are advantageous since they are good solvents as well as acid acceptors during the reaction.

The temperature at which the carbonyl halide reaction proceeds may vary from below 0° C. to about 100° C. The reaction proceeds satisfactorily at temperatures from room temperature to 50° C. Since the reaction is exothermic, the rate of phosgene addition may be used to control the temperature of the reaction. The amount of phosgene required will generally depend upon the amount of dihydric phenol present. Generally speaking, one mole of phosgene will react with one mole of dihydric phenol to form the polycarbonate and two moles of HCl. The HCl is in turn taken up by the acid acceptor.

Another method for preparing the aromatic polycarbonates useful in the present invention comprises adding phosgene to an alkaline aqueous suspension of dihydric phenols. This is preferably done in the presence of inert solvents such as methylene chloride, 1,2-dichloroethane and the like. Quaternary ammonium compounds may be employed to catalyze the reaction.

Yet another method for preparing such aromatic polycarbonates involves the phosgenation of an agitated suspension of an anhydrous alkali salt of an aryl diol in a nonaqueous medium such as benzene, chlorobenzene or toluene. The reaction is illustrated by the addition of phosgene to a slurry of the sodium salt of, for example, Bisphenol A in an inert polymer solvent such as chlorobenzene.

Generally speaking, a haloformate such as the bis-haloformate of Bisphenol A may be used in place of phosgene as the carbonate precursor in any of the methods described above.

When a carbonate ester is used as the carbonate precursor in the polycarbonate-forming reaction, the materials are reacted at temperatures in excess of 100° C., for times varying from 1 to 15 hours. Under such conditions, ester interchange occurs between the carbonate ester and the dihydric phenol used. The ester interchange is advantageously consummated at reduced pressures on the order of from about 10 to about 100 millimeters of mercury, preferably in an inert atmosphere such as nitrogen or argon.

Although the polymer-forming reaction may be conducted in the absence of a catalyst, one may, if desired, employ a typical ester exchange catalyst, such as metallic lithium, potassium, calcium or magnesium. The amount of such catalyst, if used, is usually small, ranging from about 0.001% to about 0.1%, based on the weight of the dihydric phenols employed.

In the solution method of preparation, the aromatic polycarbonate emerges from the reaction in either a true or pseudo solution depending on whether an aqueous base or pyridine is used as an acid acceptor. The copolymer may be precipitated from the solution by adding a polymer nonsolvent, such as heptane or isopropanol. Alternatively, the polymer solution may be heated, typically under reduced pressure, to evaporate the solvent.

The methods and reactants described above for preparing carbonate polymers suitable for use in the practice of this invention are discussed in greater detail in Schnell, U.S. Pat. No. 4,028,365; Campbell, U.S. Pat. No. 4,384,108; Glass, U.S. Pat. No. 4,529,791; and Grigo, U.S. Pat. No. 4,677,162, each being incorporated as a part hereof.

A preferred aromatic polycarbonate is characterized by repeated units corresponding to the general formula:

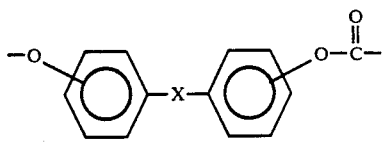

wherein X is a divalent $C_1$-$C_{15}$ hydrocarbon radical, a single bond, —O—, —S—, —$S_2$—, —SO—, —$SO_2$—, or —CO—. Each aromatic ring may additionally contain, instead of hydrogen, up to four substituents such as $C_1$-$C_4$ alkyl hydrocarbon or alkoxy radicals, aryl or aryloxy radicals, or halo radicals.

Although the polycarbonates mentioned above, such as those derived from 2,2-bis(4-hydroxyphenyl)propane ("Bisphenol-A" or "Bis-A") or from 1,1-bis(4-hydroxyphenyl)-1-phenyl ethane ("Bisphenol-A-P" or "Bis-A-P"), can each be employed in this invention as a homopolymer, the carbonate polymers used herein can also be derived from two or more bisphenols, or two or more acid- or hydroxy-terminated reactants such as dicarboxylic acids or alkylene glycols, or from two or more different dihydroxy compounds, or mixtures of any of the foregoing, in the event a carbonate copolymer or interpolymer rather than a homopolymer is desired. For example, a carbonate copolymer can be formed with Bis-A and Bis-A-P are reacted together with a carbonate precursor under the conditions described above. Copolymers can also be formed when a bisphenol is reacted with a carbonic acid derivative and a polydiorganosiloxane containing $\alpha,\omega$-bishydroxyaryloxy terminal groups to yield a siloxane/carbonate block copolymer [as are discussed in greater detail in Paul, U.S. Pat. No. 4,569,970, incorporated as a part hereof], or when a bisphenol is reacted with a bis(ar-haloformylaryl) carbonate to yield an alternating copolyestercarbonate. The bis(ar-haloformylaryl) carbonate is formed by reacting a hydroxycarboxylic acid with a carbonic acid derivative under carbonate forming conditions, and the copolyestercarbonates are discussed in greater detail in Swart, U.S. Pat. No. 4,105,533, incorporated as a part hereof. The term "polycarbonate" as used herein, and in the claims appended hereto, should therefore be understood to include carbonate homopolymers, carbonate copolymers (as described above), and/or blends of carbonate homopolymers and/or carbonate copolymers.

(b) Polyester. The aromatic polyester used in this invention may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an-[-AABB-]- polyester. Although the presence of a catalyst such as p-toluene sulfonic acid, a titanium alkoxide or a dialkyltin oxide is helpful, the primary driving force behind the direct esterification reaction is heat. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having —OH end groups, undergoes alcoholysis and polymerization to form polymeric esters and the diol is split out as a byproduct and removed from the reaction zone. The reaction is typically carried out in the presence of an inert gas.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. When a bis ester of the diacid is used for purposes of the interchange reaction, the alcohol from which the ester is formed (the alcohol to be displaced) should be lower boiling than the diol to be used for formation of polyester (the displacing alcohol). The reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs int he interchange reaction. Diol derivatives such as an acetate can be used effectively when it is desired to conduct acidolysis.

Maintenance of high temperature is an important aspect of esterification, particularly toward the end of the reaction. As a consequence, thermal ester scission competes with polymer growth as the prevailing result of the process, which places an upper limit on the molecular weight which can be achieved through the use of melt polymerization. The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produce by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 100° C., and there is no need to remove a condensation product from the reaction.

Suitable reactants for making the polyester used in this invention, other than hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions or the polymer chain can be substituted with, for example, halogens, alkoxy groups or alkyl side chains and can contain divalent heteroatomic groups (such as $-O-$, $-S-$ or $-SO_2-$) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2-C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, ciphenyletherdicarboxylic acid, diphenyldicarboxylic acid, diphenylsulfonedicarboxylic acid, diphenoxyethanedicarbocylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention. For example, use of cyclohexanedimethylol together with ethylene glycol in esterification with terephthalic acid forms a clear, amorphous copolyester ("PETG") of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters such as the poly(alkylene phenylenedicarboxylates) polyethylene terephthalate and polybutylene terephthalate, or mixtures thereof, are particularly useful in this invention.

Methods and materials useful for the production of polyesters, as described above, are discussed in greater detail in Whinfield, U.S. Pat. No. 2,465,319, Pengilly, U.S. Pat. No. 3,047,539 and Russell, U.S. Pat. No. 3,756,986, each of which is incorporated herein by reference.

(c)(i) Olefin Copolymer. An olefin copolymer which contains a carbonyl functionality in its backbone is advantageously utilized in this invention for purposes of preparing a grafted copolymer, and the preferred such olefin copolymer is ethylene/carbon monoxide ("ECO"). ECO is formed from ethylene and carbon monoxide in a pressure vessel using a peroxy catalyst or a metallic (e.g. palladium) compound as the catalyst. A hydrocarbon liquid which is non-reactive under the polymerization conditions is used as a diluent and reaction medium, and any such medium which acts as a solvent for the catalyst system and in which the catalyst is stable is typically suitable for use as the reaction medium. Air and water are preferably excluded from the reaction chamber. The polymerization can be performed at temperatures in the range from as low as 10° C. up to 200° C., but is preferably run in the range of 50° C. to 140° C. Pressures as high as 3,000 atmospheres (303 MPa) may be employed in the reaction, but the usual pressure of operation is in the range of 20 atmospheres (2.02 MPa) to about 1,500 atmospheres (151.5

MPa). Both yield and molecular weight increase with increasing pressure. Alternatively, an olefin/carbon monoxide copolymer can be made without solvent under high pressure conditions, using a free radical initiator in a stirred autoclave.

A variety of olefin monomers in place of ethylene, and numerous vinyl monomers in addition to ethylene, can be used to form the olefin copolymer backbone along with carbon monoxide. Any ethyleneically unsaturated compound containing the $>C=C<$ alkene bond which will undergo polymerization across the double bond can form part of the olefin/carbon monoxide ("olefin/CO") copolymer backbone, although olefin monomers such as propylene, isobutylene and 1-butene; and vinyl monomers such as butadiene, allyl esters, vinyl acetate, vinyl chloride; vinyl aromatics such as styrene; alkyl acrylates such as ethyl acrylate; acrylonitrile; tetrafluoroethylene and other vinyl monomers and other substituted and un-substituted higher $C_1$-$C_8$ alpha alkenes or alpha mono-olefins, and mixtures of the foregoing, are preferred. The portion of the olefin/CO copolymer derived from carbon monoxide is from about 0.1% to about 40%, and preferably from about 0.5% to about 30%, by weight. A copolymer of carbon monoxide and an alpha-mono-olefin, and methods for preparation thereof, as described above, are discussed in greater detail in Lancaster, U.S. Pat. No. 4,600,614, Brubaker, U.S. Pat. No. 2,495,286, Loeb, U.S. Pat. No. 3,083,184, Fenton, U.S. Pat. No. 3,530,109 and Nozako, U.S. Pat. No. 3,694,412, each being hereby incorporated as a part hereof.

What is set forth above concerning methods of making ECO applies equally to other forms of said olefin/CO copolymer which result from variation in the backbone monomer mix. The backbone of the olefin/CO copolymer used in this invention can be made (in conjunction with carbon monoxide) from any of the various monomers, and can be made by any of the various methods, which are included above in the discussion relating specifically to the manufacture of ECO. However, the most preferred olefin/CO polymer is ECO.

(c)(ii) Grafted Olefin/CO Copolymer. In this invention, a grafted olefin/CO copolymer is prepared by polymerizing one or more vinyl or vinylidene monomers, especially those containing a polar or electronegative group or functionality, in the form of chains grafted onto a polymeric backbone consisting of an olefin copolymer having carbon monoxide ("CO") units in the backbone. Examples of such grafting monomers are methyl acrylate, methyl methacrylate, maleic anhydride, glycidyl methacrylate, vinyl acetate, a vinyl aromatic hydrocarbon such as styrene, and a vinyl cyanide such as acrylonitrile, or mixtures thereof. The manner by which this graft polymerization is accomplished is not critical to this invention, and can be the result of any known method. Typically, but not necessarily, the monomer(s) of which the grafting chain is composed is/are brought into contact with the already-prepared olefin/CO copolymer polymeric backbone, and the grafting polymer chains will form, and graft to the backbone, in situ. However, the grafting chain could itself be prepared, from ethylenically unsaturated monomer(s), as a polymer or (copolymer) in its own right and then grafted onto the polymeric backbone. The graft polymerization can be initiated, for example, by free radical processes, by irradiation or by ionic means. The polymeric backbone and grafting monomer(s) can be brought together (1) in a suspension where the polymeric backbone is dissolved in the monomer(s) or the polymeric backbone is swelled with the monomer(s) prior to the grafting; (2) in an emulsion where the polymeric backbone is dispersed in a latex polymerization of the monomer(s); or (3) in a bulk system where a partial polymerizate of the grafting polymer or (copolymer) is formed and then the partial polymerizate is mixed with a solution of the polymeric backbone in liquid monomer and the grafting is completed under high shearing conditions. The graft polymerization can be performed in a standard reaction vessel or in the barrel of an extruder to yield product in the form of the grafted copolymer.

Other monomers which can be grafted onto an olefin/CO copolymeric backbone are vinyl compounds (especially when they bear a polar, electronegative group or functionality) such as vinyl toluene, alphamethyl styrene, halogenated styrene, methacrylonitrile or alpha-halogenated acrylonitrile; a $C_1$-$C_8$ alkyl acrylate such as ethyl acrylate, hexyl acrylate or hydroxy ethyl acrylate; a $C_1$-$C_8$ alkyl methacrylate such as hexyl methacrylate; an acrylic or methacrylic acid; the vinylidene monomers, especially when they bear a polar, electronegative group or functionality such as a halogen group, or an organic group having a double or triple bond such as phenyl, carboxy, cyano or the like; vinyl chloride, vinyl acetate, vinylidene chloride or vinyl esters or vinyl ethers; styrene and substituted derivatives thereof; maleimides; mononitriles having alpha-beta-olefinic unsaturation and lower alkyl or halogen substituents; esters of olefinically unsaturated carboxylic acids; vinyl esters; vinyl ethers; alpha-olefins; vinyl toluenes; vinyl xylenes; the maleates; the fumarates; and the like; or mixtures of two or more of any of the foregoing. In general, vinyl and vinylidene monomers from groups such as the vinyl and vinylidene -esters, -ethers, -organic acids, -epoxies, -aromatics, -alcohols, -halides, -nitriles and -amides, or mixtures thereof, can be used as the monomers to be grafted onto the olefin/CO copolymer. The portion of the grafted olefin/CO copolymer of this invention derived from the monomer(s), polymer(s) and/or copolymer(s) grafted onto the polymeric backbone is from about 1% to about 50%, and preferably from about 5% to about 30%, by weight of the grafted copolymer. The systems and method of graft polymerization described above are discussed in greater detail in Olener, U.S. Pat. No. 4,536,545, and Strait, U.S. Pat. No. 4,762,890, each of which is hereby incorporated as a part hereof.

(d) Elastomeric Toughening Agent. The toughening agent used in this invention is a rubbery or elastomeric substance, typically with a $T_g$ less than 0° C., which is suitable or effective for the purpose of imparting enough flexibility and freedom of chain rotation to a polycarbonate to improve its toughness; reduce its notch sensitivity; and enable it, in response to the deformation of an applied stress, to recover with stored modulus rather than fracture. The rubber content of the toughening agent used in this invention is greater than 40 percent by weight, and a mixture of two or more elastomeric substances can be used as the toughening agent.

Illustrative examples of elastomeric toughening agents useful in this invention are thermoplastic elastomers and emulsion-type, core-shell graft copolymer elastomers.

The thermoplastic elastomers useful in this invention are those which typically have a $T_g$ less than 0° C. They are characterized, for example, in that they can be melted and recooled, or dissolved and reformed upon removal of the solvent, without undergoing any change in properties. The thermoplastic elastomers suitable herein are also characterized by the randomness of the shape and size they take on when mixed by shearing forces with the other components making up the compositions of this invention, especially when heat is applied during such mixing. Because the thermoplastic elastomer is typically a long chain molecule, segments of thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix. The random shape and size assumed in the polymer composition matrix by a thermoplastic elastomer is to be distinguished from the shape and size assumed by a core-shell graft copolymer.

A core-shell graft copolymer is uniformly present in the polymer matrix in a bead shape both before and after mixing by application of shearing forces, whether heat is used or not, and is typically present in a rather narrow size range, for example 0.05–0.8 microns. The retention of this core-shell, or spherical, shape by the graft polymer, even after heating and mixing, results from the fact that the outer layers, which surround the core, are formed by grafting appropriate monomers onto the core. A core-shell graft copolymer typically cannot be melted and recooled without a change in properties because the graft polymer will tend to decompose or crosslink, and the bead-shaped segments of graft polymer will tend to agglomerate upon melting, making dispersion of them by mixing very difficult.

The thermoplastic elastomers useful as a toughening agent in this invention are based generally on a long-chain, typically olefininc backbone. They may be somewhat less susceptible to thermal degradation than other elastomeric toughening agents. Representative examples of a few of these thermoplastic elastomers are described below to illustrate the variation in the known substances which would suffice for such purpose.

b(i) Butyl rubber is the product of copolymerizing isobutylene and isoprene where the isoprene typically makes up no more than 2.5 mole percent of the copolymer. Although a solution process can be used to manufacture butyl rubber, most of it is made by a precipitation (slurry) method wherein the monomers are copolymerized in methyl chloride diluent using a catalyst such as aluminum chloride. Butyl rubbers, as described above, are discussed in greater detail in Green, U.S. Pat. No. 2,401,754 and Nelson, U.S. Pat. No. 2,462,123.

b(ii) Chlorosulfonated polyethylene rubbers are prepared by bubbling a mixture of chlorine and sulfur dioxide into a solution containing polyethylene, and the rubber product typically contains 20–40 parts chlorine as secondary alkyl chlorides and 1-2 parts sulfur as secondary sulfonyl chlorides. Chlorosulfonated polyethylene rubbers, as described above, are discussed in greater detail in Beekly, U.S. Pat. No. 2,640,048 and Kalil, U.S. Pat. No. 2,923,979.

b(iii) Although the presence of the pendant methyl group gives EPM (ethylene/propylene) copolymer rubber a structure similar to that of natural rubber, EPM rubber has no double bonds in the backbone. The ratio of ethylene to propylene in EPM rubber is from about 50/50 to about 75/25. However, this lack of unsaturation in the backbone precludes vulcanization, and a diene, such as hexadiene-1,5-norbornadiene-ethylidene-norbornene, is therefore frequently added to the copolymer to furnish a pendant group containing an addition polymerizable C=C bond. When a diene is copolymerized with ethylene and propylene, the product is known as EPDM rubber. EPM/EPDM rubbers, which can be made by the solution process, are described above and are discussed in greater detail in Paige, U.S. Pat. No. 3,341,503.

b(iv) Fluorinated rubbers, such as the fluorocarbon elastomer poly(tetrafluoroethylene-co-propylene), are made in a high pressure, free radical aqueous emulsion, using organic or inorganic peroxy compounds as initiators. A fluorinated carboxylic acid soap is usually used as the emulsifying agent. Fluorinated elastomers and method for making same, as described above, are discussed in greater detail in Rexford, U.S. Pat. No. 3,051,677, Honn, U.S. Pat. No. 3,053,818 and Pailthorp, U.S. Pat. No. 2,968,649.

b(v) Formation of neoprene rubber is by polymerization of 2-chloro-1,3-butadiene and can result from addition involving both of the double bonds, or through just one of the two leaving the other as a pendant group. Neoprene rubber is typically made by free radical batch emulsion polymerization, but can also be made in a continuous process. Neoprene rubber, as described above, is discussed in greater detail in Collins, U.S. Pat. No. 1,967,865 and Aho, U.S. Pat. No. 2,831,842.

b(vi) Nitrile rubber, which is polymerized from 1,3-butadiene and acrylonitrile, typically has about 15–50 parts acrylonitrile content. It is usually preferred to make nitrile rubbers by emulsion, as an aqueous system is more easily operated than one, for example, requiring a solvent. Nitrile rubber and methods for making same, as described above are discussed in greater detail in Konrad, U.S. Pat. No. 1,973,000.

b(vii) As with rubbers involving derivatives of butadiene, formation of polybutadiene can be by either 1,4 or 1,2 (vinyl) addition of the butadiene molecule. Polybutadiene rubber is typically manufactured by solution polymerization, using organic lithium compounds or coordination catalysts containing metals in reduced valence states. Polybutadiene rubber, as described above, is discussed in greater detail in Brockway, U.S. Pat. No. 2,977,349 and Ueda, U.S. Pat. No. 3,170,907.

b(viii) Polyisoprene, with its pendant methyl group on what would otherwise be a butadiene unit, also polymerizes in cis-1,4, trans-1,4 or 1,2 (vinyl) form. Cis-1,4 polyisoprene is the synthetic equivalent of natural rubber. Ziegler catalysts can be used in the polymerization of polyisoprene. Polyisoprene and methods for making same, as described above, are discussed in greater detail in Kahn, U.S. Pat. No. 3,165,503.

b(ix) Polyether rubbers include epichlorohydrin elastomers, which can be prepared either by a coordination polymerization mechanism using an aluminum alkyl-water catalyst in a hydrocarbon solvent, or in solution using benzene, toluene or methylene chloride as the solvent. Propylene oxide elastomers can also be prepared in solution, by copolymerization with allyl glycidyl ether, using a coordination catalyst such as diethyl zinc water. Polyether rubbers, as described above, are discussed in greater detail in Vandenberg, U.S. Pat. No. 3,634,303 and 3,639,267. Polyether block amides are generally represented by the structure HO—[—C(O)—PA—C(O)—(—PE—O—]$_n$—H, where PA is a polyamide segment, PE is a polyether segment, and n is an integer from 2 to 50.

b(x) Urethane elastomers are described in Schollenberger, U.S. Pat. No. 3,015,650 and Saunders, U.S. Pat. No. 3,214,411; and copolyester-ether elastomers are described in Witsiepe, U.S. Pat. No. 3,651,014.

b(xi) Block copolymers can be either linear or branched, and can be either a di-block ("A-B") copolymer or tri-block ("A-B-A") copolymer with or without tapered sections, i.e. portions of the polymer where the monomers alternate or are in random order close to the point of transition between the A and B blocks. The A portion is made by polymerizing one or more monoalkenyl or vinyl aromatic hydrocarbon monomers, and has an average molecular weight of about 4,000 to about 115,000, and a weight preferably of about 8,000 to about 60,000. The B portion of the block copolymer results from polymerizing a diene and has a molecular weight of about 20,000 to about 450,000, and a weight preferably of about 50,000 to about 300,000. In the A-B di-block copolymer, each block, A or B, can vary from 10-90% of the total weight of the copolymer. In the A-B-A tri-block copolymer, the A end groups typically constitute about 2 wt % to about 55 wt % of the whole block copolymer, and preferably are between 5 wt % and 30 wt % of the whole block copolymer.

The A block of the block copolymer has properties characteristic of thermoplastic substances in that it has the stability necessary for processing at elevated temperatures and yet possesses good strength below the temperature at which it softens. The A block is polymerized predominantly from vinyl aromatic hydrocarbons, and substituted derivatives thereof wherein the aromatic moiety can be either mono- or polycyclic. Monomers from which the thermoplastic end blocks can be formed are, for example, styrene and substituted derivatives thereof such as α-methyl styrene, vinyl xylene, vinyl naphthalene, and the like, and mixtures of two or more thereof. Other vinyl monomers such as methyl acrylate, methyl methacrylate, acrylonitrile or vinyl pyridine may be used in the formation of the A block together with the aromatic monomers. The polymerization can be initiated by lithium metal, or alkyl- or aryl lithium compounds such as butyl lithium or isoamyl lithium. Polymerization is normally conducted at temperatures ranging from about $-20°$ C. to about 100° C.

The B block of the copolymer can be formed, for example, simply by injecting suitable monomer into the reaction vessel and displacing the lithium radical from the just-polymerized A block, which then acts as an initiator because it is still charged. The B block is formed predominantly from substituted or unsubstituted $C_2$-$C_{10}$ dienes, particularly conjugated dienes such as butadiene or isoprene. Other diene, vinyl or olefinic monomers such as chloroprene, 1,4-pentadiene, isobutylene, ethylene or vinyl chloride may be used in the formation of the B block provided that they are present at a level low enough to not alter the fundamental olefinic character of the B block. The mid block will be characterized by elastomeric properties which allow it to to absorb and dissipate an applied stress and then regain its shape.

In the A-B-A tri-block copolymer, the second end block A can be formed in a manner similar to the first, by injecting appropriate alkenyl aromatic monomer (as described above) into the reaction vessel. Alternatively, a bivalent lithium initiator can be used, which, when brought together with the diene monomer under the same conditions described above, will form an elastomeric mid block B which carries a charge at each end. Then, upon addition of alkenyl aromatic monomer to the reaction mixture, a thermoplastic end block A will form on both ends of the mid block B, yielding a thermoplastic elastomeric A-B-A copolymer.

To reduce oxidative and thermal instability, the block copolymers used herein can also desirably be hydrogenated to reduce the degree of unsaturation on the polymer chain and on the pendant aromatic rings. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred thermoplastic elastomers are vinyl aromatic/conjugated diene block copolymers formed from styrene and butadiene or styrene and isoprene. When the styrene/butadiene copolymers are hydrogenated, they are frequently represented as styrene/ethylene/butylene (or styrene/ethylene/butylene/styrene in the tri-block form) copolymers. When the styrene/isoprene copolymers are hydrogenated, they are frequently represented as styrene/ethylene/propylene (or styrene/ethylene/propylene/styrene in the tri-block form) copolymers. The block copolymers described above are discussed in greater detail in Haefele, U.S. Pat. No. 3,333,024 and Wald, U.S. Pat. No. 3,595,942.

b(xii) The core-shell graft copolymer elastomers used in this invention can be based on either a diene rubber, an acrylate rubber or on mixtures thereof.

A diene rubber contains a substrate latex, or core, which is made by polymerizing a diene, preferably a conjugated diene, or by copolymerizing a diene with a mono-olefin or polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("$T_g$") of less than about 0° C., and preferably less than about $-20°$ C. A mixture of monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$-$C_8$ alkyl acrylate such as ethyl acrylate or hexyl acrylate; a $C_1$-$C_8$ alkyl methacrylate such as methyl methacrylate or hexyl methacrylate; acrylic or methacrylic acid; and the like or a mixture of two or more thereof.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl methacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494.

An acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2-C_6$, most preferably butyl acrylate. The elastomeric core phase should have a $T_g$ of less than about 25° C., and preferably less than about 0° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Monomers such as an alkyl ester of an unsaturated carboxylic acid, for example a $C_1-C_8$ alkyl acrylate like methyl acrylate, hydroxy ethyl acrylate or hexyl acrylate, or a $C_1-C_8$ alkyl methacrylate such as methyl methacrylate or hexyl methacrylate, or mixtures of any of the foregoing, are some of the monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 40% to about 95% by weight of an elastomeric core and about 60% to about 5% of a rigid thermoplastic phase. The elastomeric core can be polymerized from about 75% to about 99.8% by weight $C_1-C_6$ acrylate, preferably n-butyl acrylate. The rigid thermoplastic phase can be polymerized from at least 50% by weight of $C_1-C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928.

Each of the patents cited in the foregoing description of rubbery, elastomeric toughening agents, and methods for the preparation thereof, is incorporated as a part hereof.

(e) Fillers. Fillers, many of which serve also as reinforcing agents, are another optional component which can be used in this invention. Representative examples of such fillers include organic and inorganic fibers such as those made from asbestos, boron, graphite, ceramic, glass, metals (such as stainless steel) or polymers (such as aramid fibers). The fillers useful in this invention also include mineral fillers such as aluminum trihydrate, mica, and conductive fillers.

Other representative organic or inorganic, fiber or mineral, fillers include carbonates such as barium, calcium or magnesium carbonate; fluorides such as calcium or sodium aluminum fluoride; hydroxides such as aluminum hydroxide; metals such as aluminum, bronze, lead or zinc; oxides such as aluminum, antimony, magnesium or zinc oxide, or silicon or titanium dioxide; silicates such as asbestos, clay (kaolin or calcined kaolin), calcium silicate, feldspar, glass (ground or flaked glass or hollow glass spheres), nepheline, perlite, pyrophyllite, talc or wollastonite; sulfates such as barium or calcium sulfate; metal sulfides; cellulose, in forms such as wood or shell flour; calcium terephthalate; and liquid crystals. Mixtures of more than one such filler may be used as well.

A variety of additives, in addition to the fillers and reinforcing agents discussed in the paragraph above, is available, and typically finds use in compositions such as those of this invention, for protection against thermal, oxidative and ultra-violet degradation. Such additives may be included in the composition at any point during the processing, and the choice as to which additive is employed is not critical to this invention. Representative of the thermal and oxidative stabilizers which can advantageously be utilized are hindered phenols, hydroquinones, phosphites and thioesters, including substituted members of those groups and/or mixtures of more than one thereof. A preferred phenolic anti-oxidant is Irganox ™ 1076 anti-oxidant, which is available from Ciba-Geigy Corp. and is discussed in greater detail in Dexter, U.S. Pat. No(s). 3,285,855 and 3,330,859, each being hereby incorporated as a part hereof. Ultraviolet stabilizers such as various substituted resorcinols, salicylates, benzotriazoles, benzophines, hindered amines, and hindered phenols can also be usefully included in the compositions of this invention, as can be lubricants, colorants, pigments, ignition resistant additives and mold release agents. Additives and stabilizers such as the foregoing, and many others which have not been mentioned, are known in the art, and the decision as to which, if any, to use is not critical to this invention. However, other than the fillers and reinforcing agents discussed in the paragraph above, such additives, if used, will not together exceed 5% by weight of the total composition.

Illustrative Embodiments. To illustrate the practice of this invention, examples of several preferred embodiments are set forth below. It is not intended, however, that these examples (Examples 1-14) should in any manner restrict the scope of this invention. Some of the particularly desirable features of this invention may be seen by contrasting the characteristics of Examples 1-14 with those of various controlled formulations (Controls A-E) which do not possess the features of, and are not therefore embodiments of, this invention.

The polycarbonate compositions prepared in Examples 1-14 and Controls A-E are made by dry blending the ingredients thereof and agitating same in a paint shaker for 7 minutes. The dry blended formulations are then melt mixed in a vented 30 mm Werner-Phfleiderer co-rotating, twin screw extruder using a 270° C. set temperature and 250 rpm. Each extruder composition is passed through a water bath, chopped into granules and collected for molding. Experimental samples are thoroughly dried in a circulated air oven at 105° C. for six hours prior to molding. All samples are prepared by injection molding on a 75 ton ($6.8 \times 10^4$ kg) Arburg molding machine. Molding temperatures for the barrel and mold are set at 270° C. and 190° F., respectively.

The formulations of the polycarbonate compositions of Examples 1-6 and Controls A-C are given in Table I in grams. In Table I:

"(1) Polycarbonate" is Calibre ®300-10 polycarbonate resin, a 10 melt flow value polycarbonate resin available from The Dow Chemical Company. Melt flow value is measured according to ASTM Designation D 1238-85, Condition 0.

"(2) PET-II" is polyethylene terephthalate having an inherent viscosity of 1.04, as measured in accordance with ASTM Designation D 4603-86.

"(3) PET-III" is polyethylene terephthalate having an inherent viscosity of 0.59.

"(4) AEC" is an aromatic ester carbonate copolymer wherein 75% of the copolymer by weight is carbonate units and 25% is ester units.

"(5) P-3607" is Paraloid TM 3607 core-shell polymer, an MBS rubber.

"(6) P-3330" is Paraloid TM 3330 composite interpolymer, a butyl acrylate rubber.

"(7) ECO" is an ethylene/carbon monoxide copolymer containing 10% carbon monoxide by weight.

"(8) PMMA" is V-052 Plexiglass TM acrylate polymer, a poly-methyl methacrylate available from Rohm and Haas Corporation.

"(9) ECOgMMA" is a grafted copolymer wherein methyl methacrylate ("MMA") is grafted onto an ethylene/CO copolymer. The portion of the ethylene/CO copolymer derived from carbon monoxide is 10% by weight. The portion of the ECOgMMA grafted copolymer derived from MMA is 20% by weight.

"(10) Polyolefin" is a 0.92 density low density polyethylene.

"(11) ESO", epoxidized soybean oil, is used as a tackifier to cause "(12) IR-1076", Irgnanox TM 1076 anti-oxidant, to adhere to and be evenly distributed over the pellets making up the balance of the contents of each composition.

TABLE I

| Content of Controls A-C and Examples 1-6 in grams | | | | | | | | | |
|---|---|---|---|---|---|---|---|---|---|
| | Contr. A | Contr. B | Contr. C | Ex. 1 | Ex. 2 | Ex. 3 | Ex. 4 | Ex. 5 | Ex. 6 |
| (1) Polycarbonate | 1,360 | 1,360 | 1,340 | 1,340 | 1,340 | 1,540 | 1,300 | 1,060 | 1,220 |
| (2) PET-II | 400 | 400 | 400 | 400 | 400 | — | — | — | 400 |
| (3) PET-III | — | — | — | — | — | 200 | 400 | 600 | — |
| (4) AEC | — | — | — | — | — | — | — | — | 100 |
| (5) P-3607 | 140 | 140 | 140 | 140 | — | 140 | 140 | 140 | 140 |
| (6) P-3330 | — | — | — | — | 140 | — | — | — | — |
| (7) ECO | — | 100 | 100 | — | — | — | — | — | — |
| (8) PMMA | — | — | 20 | — | — | — | — | — | — |
| (9) ECOgMMA | — | — | — | 120 | 120 | 120 | 160 | 200 | 140 |
| (10) Polyolefin | 100 | — | — | — | — | — | — | — | — |
| (11) ESO | 2 | 2 | 2 | 2 | 2 | 2 | 2 | 2 | 2 |
| (12) IR-1076 | 4 | 4 | 4 | 4 | 4 | 4 | 4 | 4 | 4 |

The results of tests performed on the blended polycarbonate compositions of Example 1-6 and Controls A-C are shown below in Table II. In Table II:

Impact resistance is measured by the Izod test according to ASTM Designation D 256-84 (Method A). The notch is 10 mils (0.254 mm) in radius. An inverted T ($\perp$) indicates that the notch is cut so that the flexural shock caused by the striking nose of the pendulum is propagated parallel to the direction of flow taken by the molten extrudate during formation of the sample. Vertical parallel lines ($\|$) indicate that the notch is cut so that the flexural shock caused by the striking nose of the pendulum is propagated perpendicular to the direction of flow taken by the molten extrudate during formation of the sample. The results are reported first in ft-lb/in and then in J/m.

Weldline Izod strength is also measured according to ASTM Designation D 256-84 (Method A) at 23° C., but with respect to a sample which has been formed with a butt weld in a double gated mold. The sample is unnotched, and it is placed in the vise so that the weld is coincident with the top surface of the vise jaws. The results are reported first in ft-lb/in and then in J/m.

Tensile strength and percent elongation at break are measured in accordance with ASTM Designation D 628-84.

Environmental stress failure resistance ("ESFR") is evaluated by measuring tensile strength at break, and percent elongation at break, in accordance with ASTM Designation D 638-84, with respect to samples which have been placed under 0.7% strain while submerged in a bath of 60 wt % isooctane and 40 wt % toluene for 5 minutes and then have been allowed to dry for 24 hours before testing. The results are reported first in psi and then in MPa.

TABLE II

| Test Results of Controls A-C and Examples 1-6 | | | | | | | | | |
|---|---|---|---|---|---|---|---|---|---|
| | Contr. A | Contr. B | Contr. C | Ex. 1 | Ex. 2 | Ex. 3 | Ex. 4 | Ex. 5 | Ex. 6 |
| Weldline | 2.5 | 3.0 | 2.8 | 16.2 | 17.4 | 18.0 | 15.2 | 8.8 | 14.8 |
| Izod | 133.4 | 160.1 | 149.5 | 864.7 | 928.8 | 960.8 | 811.4 | 469.7 | 790.0 |
| Izod, $\perp$ | 4.8 | 8.2 | 7.0 | 9.8 | 12.6 | 9.2 | 8.5 | 8.1 | 9.1 |
| 23° C. | 256.2 | 437.7 | 373.6 | 523.1 | 672.6 | 491.1 | 453.7 | 432.4 | 485.7 |
| Izod, $\perp$ | 2.3 | 3.7 | 4.3 | 7.5 | 10.3 | 7.3 | 5.9 | 3.7 | 7.3 |
| 0° C. | 122.8 | 197.5 | 229.5 | 400.3 | 549.8 | 389.7 | 314.9 | 197.5 | 389.7 |
| Izod, $\|$, | 11.6 | 12.5 | 12.1 | 11.8 | 13.7 | 11.8 | 11.1 | 11.3 | 12.0 |
| 23° C. | 619.2 | 667.2 | 645.9 | 629.9 | 731.3 | 629.9 | 592.5 | 603.2 | 640.5 |
| Izod, $\|$, | 11.2 | 12.1 | 11.5 | 11.2 | 11.9 | 11.2 | 11.1 | 10.3 | 11.3 |
| 0° C. | 597.8 | 645.9 | 613.9 | 597.8 | 635.2 | 597.8 | 592.5 | 549.8 | 603.2 |
| ESFR | 6,173 | 8,384 | 7,972 | 8,032 | 8,567 | 8,266 | 8,017 | 7,961 | 7,611 |

TABLE II-continued

| | Contr. A | Contr. B | Contr. C | Ex. 1 | Ex. 2 | Ex. 3 | Ex. 4 | Ex. 5 | Ex. 6 |
|---|---|---|---|---|---|---|---|---|---|
| Tensile Strength at Break | 42.6 | 57.8 | 55.0 | 55.4 | 59.1 | 57.0 | 55.3 | 54.9 | 52.5 |
| ESFR | 82 | 123 | 119 | 113 | 130 | 106 | 113 | 150 | 100 |
| % Elong. at Break | | | | | | | | | |

Test Results of Controls A-C and Examples 1-6

It can be seen from these test results that, when a grafted olefin/CO copolymer is admixed with a polycarbonate/aromatic polyester blend, a substantially higher weldline Izod value is obtained than in such a blend containing LDPE or ECO instead of the grafted olefin/CO copolymer. The blends containing a grafted olefin/CO copolymer also registered ESFR and notched Izod results which were comparable to or better than the corresponding results in blends containing LDPE or ECO. As poor weldline strength can be a condition which indicates a potential that delamination of component(s) blended with polycarbonate will occur, and as Control 1 in fact showed severe delamination during testing, it is clear that the presence of the grafted olefin/CO blend is effective as a notable hindrance to any tendency on the part of the blended polycarbonate/aromatic polyester composition to splinter or peel. The superior Izod weldline values, coupled with the good ESFR results, show unexpected attainment of superior levels of measurement in a balance of several different physical properties of a polycarbonate/aromatic polyester blend, as opposed to blends in which increases in the ESFR alone are attained at the expense of the impact and weldline strength thereof.

The formulations of the polycarbonate compositions of Examples 7 and 8 and Controls D-E are given below in Table III in grams. In Table III:

"(1) PC 300-10" is Calibre ®300-10 polycarbonate resin, a 10 melt flow value polycarbonate resin available from The Dow Chemical Company.

"(2) PET-II" is polyethylene terephthalate having an inherent viscosity of 0.95, as measured in accordance with ASTM Designation D 4603-86.

"(3) EcogMMA" is a grafted copolymer wherein methyl methacrylate ("MMA") is grafted onto an ethylene/CO copolymer. The portion of the ethylene/CO copolymer derived from carbon monoxide is 10% by weight. The portion of the ECOgMMA grafted copolymer derived from MMA is 20% by weight.

"(4) ECOgMA/MMA" is a grafted copolymer wherein methyl acrylate ("MA") and methyl methacrylate ("MMA") is grafted onto an ethylene/CO copolymer. The portion of the ethylene/CO copolymer derived from carbon monoxide is 10% by weight. The portion of the ECOgMMA grafted copolymer derived from MA and MMA is 20% by weight.

"(5) E/CO/VA" is an ethylene/carbon monoxide/vinyl acetate copolymer available from DuPont as Elvaloy ™ 741 copolymer. The vinyl acetate portion of Elvaloy ™ 741 copolymer is polymerized in random order together with the ethylene and carbon monoxide, not grafted onto a preformed ethylene/carbon monoxide copolymer.

The results of tests performed on the blended polycarbonate compositions of Examples 7 and 8 and Controls D-E are also shown below in Table III. In Table III:

Impact resistance is measured by the Izod test according to ASTM Designation D 256-84 (Method A) at 23° C. The notch is 10 mils (0.254 mm) in radius. An inverted T (⊥) indicates that the notch is cut so that the flexural shock caused by the striking nose of the pendulum is propagated parallel to the direction of flow taken by the molten extrudate during formation of the sample. Vertical parallel lines ( || ) indicate that the notch is cut so that the flexural shock caused by the striking nose of the pendulum is propagated perpendicular to the direction of flow taken by the molten extrudate during formation of the sample. The results are reported in ft-lb/in.

Weldline Izod strength is also measured according to ASTM Designation D 256-84 (Method A) at 23° C., but with respect to a sample which has been formed with a butt weld in a double gated mold. The sample is unnotched, and it is placed in the vise so that the weld is coincident with the top surface of the vise jaws. The results are reported in ft-lb/in.

Deflection temperature under load ("DTUL") is measured in accordance with ASTM Designation D 648-82 at 66 psi.

Flexural Modulus is measured in accordance with ASTM Designation D 790-84a.

TABLE III

Content (in grams) and Test Results for Controls D-E and Examples 7 and 8

| | Controls | | Examples | |
|---|---|---|---|---|
| | D | E | 7 | 8 |
| (1) PC 300-10 | 1,500 | 1,400 | 1,460 | 1,460 |
| (2) PET | 400 | 400 | 400 | 400 |
| (3) ECOgMMA | — | — | 140 | — |
| (4) ECOgMA/MMA | — | — | — | 140 |
| (5) E/CO/VA | 100 | 200 | — | — |
| Izod, ⊥, ft-lb/in | 3.2 | 2.7 | 13.6 | 14.3 |
| Izod, ||, ft-lb/in | 14.5 | 18.0 | 14.5 | 15.9 |
| Weldline Izod, ft-lb/in | 3.9 | 2.5 | 14.4 | 13.2 |
| DTUL, °F. | 264 | 270 | 274 | 272 |
| Flexural Modulus, × $10^5$ psi | 3.24 | 2.95 | 3.70 | 3.65 |

The results of the perpendicular and weldline Izod test performed on Controls D and E and Examples 7 and 8 demonstrate the improvement in impact resistance attained in composition of this invention, which contains an ethylene/carbon monoxide copolymer to which a monomer is grafted, as opposed to a composition in which ethylene, carbon monoxide and another monomer have been polymerized in random fashion.

The formulations of the polycarbonate compositions of Examples 9-14 are given in Table IV in grams. In Table IV:

"(1) PC 300-13" is Calibre ®300-13 polycarbonate resin, a 13 melt flow value polycarbonate resin available from The Dow Chemical Company.

"(2) PET" is polyethylene terephthalate having an inherent viscosity of 0.95, as measured in accordance with ASTM Designation D 4603-86.

"(3) ECOgMA/MMA" is a grafted copolymer wherein methyl acrylate ("MA") and methyl methacrylate ("MMA") is grafted onto an ethylene/CO copolymer. The portion of the ethylene/CO copolymer derived from carbon monoxide is 10% by weight. The portion of the ECOgMMA grafted copolymer derived from MA and MMA is 20% by weight.

"(4) P-3607" is Paraloid TM 3607 core-shell polymer, an MBS rubber.

"(5) Talc" is MP-1052 talc, available from Pfizer Pharmaceutical Co.

"(6) Clay" is 1641-YA clay, a surface-treated experimental clay available from Anglo-American Clay Co.

"(7) Fiberglass" is OCF-415 fiberglass available from Owens-Corning Co.

The polycarbonate compositions of Examples 9-14 are prepared by melt mixing the components thereof in a 30-mm Werner-Phfleiderer extruder with a vacuum on the vent ports and a set temperature of 290° C.

The results of tests performed on the blended polycarbonate compositions of Examples 9-14 are also shown below in Table IV. In Table IV:

Impact resistance is measured by the Izod test according to ASTM Designation D 256-84 (Method A) at 23° C. The notch is 10 mils (0.254 mm) in radius and is cut so that the flexural shock caused by the striking nose of the pendulum is propagated perpendicular to the direction of flow taken by the molten extrudate during formation of the sample. The results are reported in ft-lb/in.

Coefficient of linear thermal expansion ("CLTE") is measured from −20° F. to 190° F. in accordance with ASTM Designation D 969-79. The maximum reading, taken at 190° F., is reported.

Flexural Modulus is measured in accordance with ASTM Designation D 790-84a.

Environmental stress failure resistance ("ESFR") is evaluated with respect to (i) samples which have been annealed at 250° F. for thirty minutes, then placed under 0.5% strain while submerged in a bath of 60 wt % isooctane and 40 wt % toluene for 5 minutes, and then allowed to dry for 24 hours before testing; and (ii) annealed samples which have not been soaked in the solvent bath. Percent elongation at break, in accordance with ASTM Designation D 638-84, is measured with respect to each kind of sample, and a ratio is formed containing the elongation of the solvent-treated sample in the numerator and the elongation of the untreated sample in the denominator. This ratio is expressed as a percentage, and is reported as the portion (i.e. percentage) of the elongation of the untreated sample that is retained, and thus shown by the solvent-treated sample, after the solvent bath.

TABLE IV

Content (in grams) and Test Results of Examples 9-14

| | Examples | | | | | |
|---|---|---|---|---|---|---|
| | 9 | 10 | 11 | 12 | 13 | 14 |
| (1) PC 300-13 | 1,360 | 1,288 | 1,238 | 1,142 | 1,275 | 1,250 |
| (2) PET | 400 | 380 | 364 | 336 | 380 | 380 |
| (3) ECOgMA/MMA | 140 | 133 | 127 | 118 | 150 | 150 |
| (4) P-3607 | 100 | 95 | 91 | 84 | 95 | 95 |
| (5) Talc | — | 100 | 180 | 320 | 50 | — |
| (6) Clay | — | — | — | — | — | 75 |
| (7) Fiberglass | — | — | — | — | 50 | 50 |
| Izod, ft-lb/in | 13.5 | 13.9 | 7.0 | 1.6 | 4.5 | 2.7 |
| CLTE, in/in-°F. | 4.5 | 4.0 | 3.6 | 3.0 | 3.6 | 3.5 |
| Flexural Modulus, × $10^5$ psi | 2.9 | 3.5 | 4.2 | 4.6 | 3.5 | 3.6 |
| ESFR, Percent retention of elongation | 103 | 100 | 95 | 90 | 88 | 90 |

The results in Table IV demonstrate that the filled blends have reduced CLTE and therefore greater stiffness, as can be seen in the Flexural Modulus readings. Example 11 is particularly notable because it has a desirably low CLTE reading while retaining an acceptably high Izod reading.

It is within the skill in the art to practice this invention in numerous modifications and variations in light of the above teachings. It is, therefore, to be understood that the various embodiments of this invention described herein may be altered without departing from the spirit and scope of this invention as defined by the appended claims.

What is claimed is:

1. A composition of matter comprising, in admixture, an aromatic polycarbonate, an aromatic polyester and a grafted olefin/carbon monoxide copolymer.

2. The composition of claim 1 wherein one or more vinyl or vinylidene monomers, or mixtures thereof, are grafted onto the olefin/carbon monoxide copolymer.

3. The composition of claim 2 wherein the portion of the olefin/carbon monoxide copolymer derived from the monomer(s) or mixtures thereof, grafted to said olefin/carbon monoxide copolymer is from about 1% to about 50% by weight of said olefin/carbon monoxide copolymer.

4. The composition of claim 1 wherein one or more monomers selected from the group consisting of an acrylate, a methacrylate and an acetate are grafted onto the olefin/carbon monoxide copolymer.

5. The composition of claim 1 wherein one or more monomers selected from the group consisting of an acetate, a vinyl compound derived from acrylic acid, a vinyl aromatic compound, and a vinyl cyanide are grafted onto the olefin/carbon monoxide copolymer.

6. The composition of claim 5 wherein at least a mixture of styrene and acrylonitrile is grafted onto the olefin/carbon monoxide copolymer.

7. The composition of claim 1 or 2 wherein one or more polymers or copolymers, or mixtures thereof, polymerized from one or more vinyl or vinylidene monomers, or mixtures thereof, are grafted onto the olefin/carbon monoxide copolymer.

8. The composition of claim 7 wherein at least a styrene/acrylonitrile copolymer is grafted onto the olefin/carbon monoxide copolymer.

9. The composition of claim 1 wherein said olefin/carbon monoxide copolymer is a copolymer of ethylene and carbon monoxide.

10. The composition of claim 1 wherein the portion of the olefin/carbon monoxide copolymer derived from carbon monoxide is about 0.1% to about 40% by weight.

11. The composition of claim 1 further comprising an elastomeric toughening agent.

12. The composition of claim 11 wherein the elastomeric toughening agent is a thermoplastic elastomer or a core-shell graft copolymer, or a mixture thereof.

13. The composition of claim 11 further comprising a filler.

14. The composition of claim 13 wherein the content thereof by weight of the total composition is (a) about 9 parts to about 94 parts aromatic polycarbonate, (b) about 1 part to about 25 parts grafted olefin/carbon monoxide copolymer, (c) about 5 parts to about 90 parts aromatic polyester, (d) up to about 20 parts elastomeric toughening agent, and (e) up to about 40 parts filler.

15. The composition of claim 1, 11 or 13 in the form of a molded article.

16. The composition of claim 1, 11 or 13 in the form of an extruded sheet.

17. The composition of claim 13 wherein the filler is one or more of the filler selected from the group consisting of organic fibers, inorganic fibers and mineral fillers.

18. A composition of matter comprising, in admixture, an aromatic polycarbonate, a poly(alkylene phenylenedicarboxylate) and a grafted olefin/carbon monoxide copolymer.

19. A composition of matter comprising, in admixture,
    (a) an aromatic polycarbonate;
    (b) an aromatic polyester selected from poly(ethylene terephthalate), poly(butylene terephthalate), and a mixture thereof; and
    (c) a copolymer
        (i) polymerized from carbon monoxide and one or more of the monomers selected from the group consisting of ethylene, vinyl acetate and an alkyl acrylate,
        onto which is grafted
        (ii) one or more members of the group consisting of an alkyl acrylate, an alkyl methacrylate, vinyl acetate, a vinyl aromatic compound, a vinyl cyanide, and glycidyl methacrylate.

20. The composition of claim 19 further comprising (d) one or more of the elastomeric toughening agents selected from the group consisting of a thermoplastic elastomer and a core-shell graft copolymer.

21. The composition of claim 20 wherein the elastomeric toughening agent is one or more of the members selected from the group consisting of ethylene/propylene/diene rubber, nitrile rubber, polyisoprene, hydrogenated styrene/butadiene block copolymer, hydrogenated styrene/isoprene block copolymer, alkyl methacrylate/butadiene/styrene core-shell elastomer, and alkyl acrylate core-shell elastomer.

22. The composition of claim 19 or 20 further comprising (e) a talc filler.

23. The composition of claim 19 or 20 further comprising (e) one or more of the fillers selected from the group consisting of talc, glass, clay, mica, wollastonite, graphite, silica, aramid fibers, and metal fibers.

24. The composition of claim 7 wherein the portion of the olefin/carbon monoxide copolymer derived from the monomer(s), or mixtures thereof, grafted to said olefin/carbon monoxide copolymer is from about 1% to about 50% by weight of said olefin/carbon monoxide copolymer.

* * * * *